June 7, 1949.    D. B. CORBYN    2,472,367
ELECTRICALLY OPERATED VIBRATOR APPARATUS
Filed Oct. 28, 1947
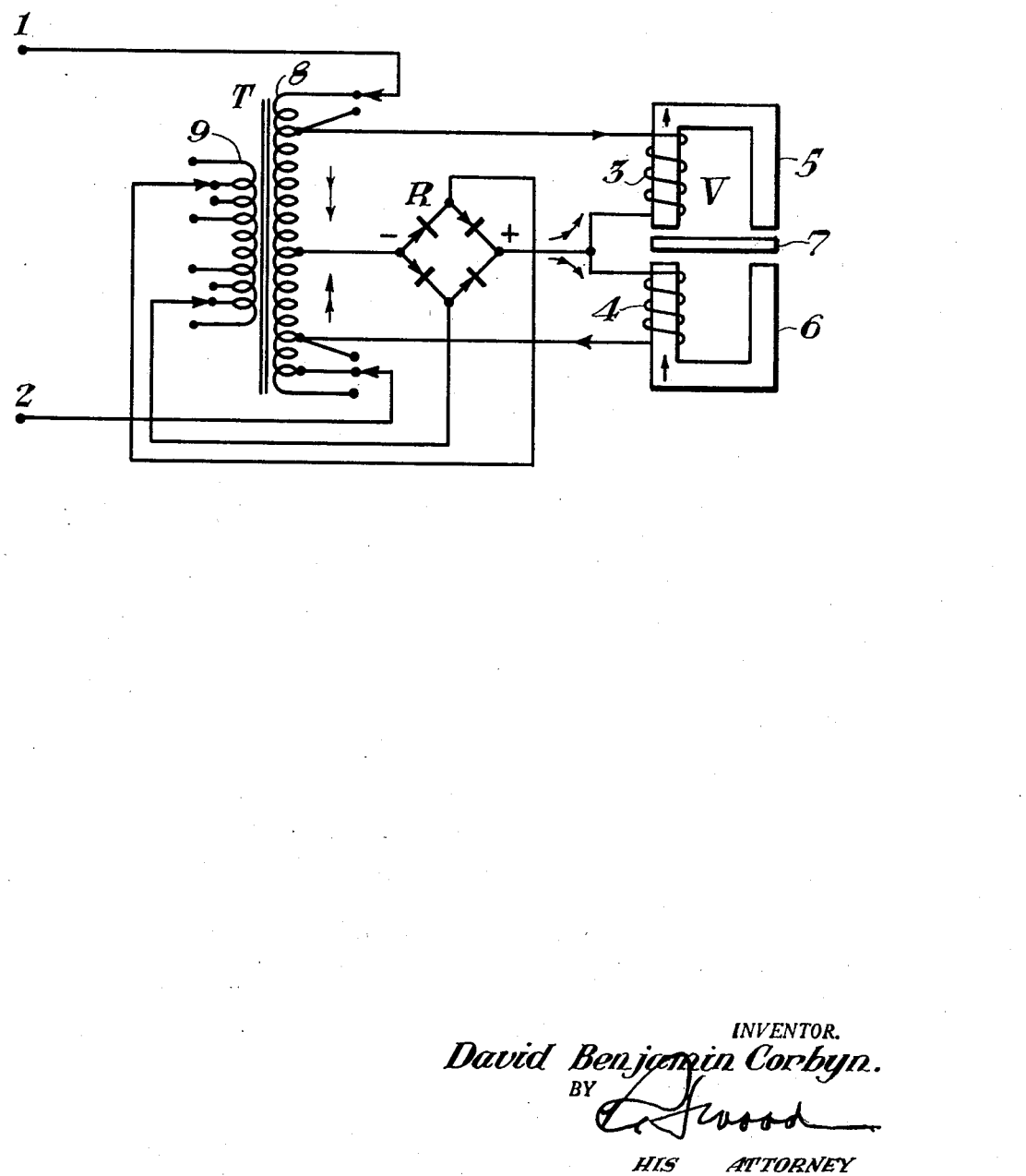
INVENTOR.
David Benjamin Corbyn.
BY
HIS ATTORNEY Patented June 7, 1949

2,472,367

UNITED STATES PATENT OFFICE 2,472,367

ELECTRICALLY OPERATED VIBRATOR APPARATUS

David Benjamin Corbyn, London, England, assignor, by mesne assignments, to The Union Switch and Signal Company, Swissvale, Pa., a corporation of Pennsylvania Application October 28, 1947, Serial No. 782,516 In Great Britain May 14, 1947

2 Claims. (Cl. 318—132)

This invention relates to electrically operated vibrator apparatus of the kind adapted to be operated from an alternating electric current supply circuit and has for its object to provide improved apparatus of this character.

The apparatus of the invention comprises a double-acting vibrator device provided with two operating electro-magnets acting in opposite direction on a vibrating member or armature constructed of magnetic material, the energizing windings of these electro-magnets being connected in series with one another across the supply circuit in parallel with an inductance the central point of which is connected in series with a source of unidirectional current to the point of series connection of the two electro-magnet windings so that these windings are supplied with unidirectional current in parallel with one another.

When the unidirectional current is zero, the attractions exerted upon the armature by the two electro-magnets will evidently neutralize each other so that the armature will remain stationary. When, however, unidirectional current traverses the energizing windings of the two electro-magnets the opposite attractions exerted on the armature will no longer neutralize each other and a periodic attraction of the armature at the supply circuit frequency will result. The amplitude of this attraction is dependent upon the magnitude of the unidirectional current and becomes greater as the unidirectional current increases. In practice it is usually sufficient to make the unidirectional current equal to the maximum amplitude of the alternating current wave.

According to the invention the inductance connected to the supply circuit is constituted by the primary winding of a transformer from the secondary winding of which, through a rectifier, unidirectional current is supplied to the electromagnet windings.

One form of apparatus embodying the invention will now be described, and the novel features thereof will then be pointed out in claims.

Referring to the accompanying drawing, the reference character V designates the vibrator, which comprises two similar windings 3 and 4 mounted respectively on laminated magnetic cores 5 and 6 which are disposed on opposite sides of a movable magnetic armature 7. It is to be understood the armature 7 is connected in a suitable manner to the device to be vibrated, the latter comprising a screen or dust collector, for example, or a percussion tool, saw or the like.

The vibrator windings 3 and 4 are energized in series by alternating current over adjustable connections or taps on the primary winding 8 of a transformer T connected across the supply terminals 1 and 2 of the primary A. C. supply source.

At the same time the vibrator windings 3 and 4 are energized in parallel by unidirectional current supplied by a full wave metallic rectifier R having one output terminal connected to the junction of windings 3 and 4, and the other to a tap located at the middle of winding 8. The input terminals of rectifier R are supplied with alternating current over adjustable connections to a secondary winding 9 of transformer T. It will be readily apparent that with this construction the magnetic pull exerted upon the armature 7 will be that due to the sum of difference, as the case may be, of the instantaneous values of the alternating and unidirectional currents supplied to the magnets 3 and 4 so that the armature may be caused to vibrate with considerable force at the supply frequency even though it is restrained by a relatively heavy load.

The alternating current supplied to the input terminals of the rectifier may also be arranged to be varied as desired by means of control switches connected to tappings in the transformer windings, adjustable resistances, variable magnetic shunts or other well-known devices.

In carrying the invention into practice, the primary winding of transformer T is connected, preferably through adjustable tappings, to the supply circuit conductors, and the vibrator windings 3 and 4 are connected in series with one another across points in the transformer primary winding 8 equally distant from its central point to which one of the output terminals of the rectifier R is connected.

It will be evident that by varying the adjustment of the control switches or other devices above referred to, the magnitude of the unidirectional current supplied to the vibrator windings in parallel with one another can be readily varied so as correspondingly to vary the amplitude of vibration of the armature 7 in accordance with the load and amount of vibration desired, depending upon the purpose for which the vibrations are utilized.

The invention is evidently not limited to any particular constructional form of the vibrator mechanism.

Although I have herein shown and described only one form of apparatus embodying my invention, it is to be understood that various changes and modifications may be made therein within the scope of the appended claims without departing from the spirit and scope of my invention.

Having thus described my invention, what I claim is:

1. In combination with an electric vibrator comprising two electro-magnets arranged to act in opposite directions on a movable armature, a transformer supplied with alternating current and having a middle terminal and two end terminals, a metallic rectifier supplied with alternating current by said transformer, means comprising connections to the two end terminals of said transformer for energizing said magnets in series by alternating current, and means comprising connections from said middle terminal through said rectifier for energizing said magnets in parallel by unidirectional current supplied thereby, to render said magnets effective alternately and thereby cause the vibration of said armature at the frequency of said alternating current.

2. In combination with an electric vibrator comprising two electro-magnets arranged to act in opposite directions on a movable armature, a source of alternating current supply, a transformer having primary and secondary windings, the end terminals of said primary winding being connected to the terminals of said source, a source of unidirectional current comprising a full wave metallic rectifier supplied with energy from said secondary winding, circuit means for energizing said electro-magnets in series by alternating current from said source and in parallel by unidirectional current from said rectifier to cause the vibration of said armature at the frequency of said alternating current, and switching means for separately adjusting the values of the alternating and unidirectional currents supplied to said magnets.

DAVID BENJAMIN CORBYN.

REFERENCES CITED

The following references are of record in the file of this patent:

UNITED STATES PATENTS

| Number | Name | Date |
|---|---|---|
| 2,419,686 | Lindsay | Apr. 29, 1947 |

FOREIGN PATENTS

| Number | Country | Date |
|---|---|---|
| 524,868 | Great Britain | Aug. 16, 1940 |